United States Patent
Ozawa

(10) Patent No.: US 10,681,315 B2
(45) Date of Patent: Jun. 9, 2020

(54) IMAGE DISPLAY APPARATUS, IMAGE DISPLAY SYSTEM, AND METHOD FOR CONTROLLING IMAGE DISPLAY APPARATUS

(71) Applicant: SEIKO EPSON CORPORATION, Tokyo (JP)

(72) Inventor: Takaaki Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/256,200

(22) Filed: Jan. 24, 2019

(65) Prior Publication Data

US 2019/0230327 A1 Jul. 25, 2019

(30) Foreign Application Priority Data

Jan. 25, 2018 (JP) ................. 2018-010297

(51) Int. Cl.
*H04N 9/31* (2006.01)
*G02F 1/13357* (2006.01)

(52) U.S. Cl.
CPC ..... *H04N 9/3147* (2013.01); *G02F 1/133615* (2013.01); *H04N 9/315* (2013.01); *H04N 9/3138* (2013.01)

(58) Field of Classification Search
CPC ...... G03B 21/28; G03B 21/94; G03B 21/147; H04N 9/315; H04N 9/3138; H04N 9/3147; H04N 9/3182; H04N 9/3185; H04N 9/3188; H04N 9/3194
See application file for complete search history.

(56) References Cited

U.S. PATENT DOCUMENTS

| | | | |
|---|---|---|---|
| 2014/0104582 A1* | 4/2014 | Mori | H04N 9/3185 353/30 |
| 2015/0154783 A1* | 6/2015 | Grundhofer | H04N 5/7458 348/745 |
| 2017/0180714 A1* | 6/2017 | Helt | H04N 13/363 |
| 2017/0214895 A1* | 7/2017 | Fujioka | H04N 9/3188 |

FOREIGN PATENT DOCUMENTS

JP 2002-44627 A 2/2002

* cited by examiner

*Primary Examiner* — Sultan Chowdhury
(74) *Attorney, Agent, or Firm* — Oliff PLC

(57) ABSTRACT

A projector includes an image projection section that displays an image based on image information, a communication section that communicates with another projector, an input operation section that accepts operation for executing a light source color adjustment process, a light source color adjustment section that executes the light source color adjustment process based on the operation accepted by the input operation section, and a control section that causes the communication section to transmit, based on the operation accepted by the input operation section, control information that causes the other projector to perform the light source color adjustment process to the other projector.

15 Claims, 6 Drawing Sheets

IMAGE DISPLAY APPARATUS, IMAGE DISPLAY SYSTEM, AND METHOD FOR CONTROLLING IMAGE DISPLAY APPARATUS

The entire disclosure of Japanese Patent Application No. 2018-010297, filed Jan. 25, 2018 is expressly incorporated by reference herein.

BACKGROUND

1. Technical Field

The present invention relates to an image display apparatus, an image display system, and a method for controlling the image display apparatus.

2. Related Art

There is a known image display apparatus (projector, for example) that automatically acts in accordance with schedule information set in advance. A projector described in JP-A-2002-44627 includes a schedule control circuit that produces a variety of action requests in accordance with stored schedule information. In a case where the schedule information is set in accordance with time information inputted from a clock, the schedule control circuit produces a variety of action requests in accordance with the set schedule information and causes the projector to perform a variety of actions. As examples of the action performed by the projector in accordance with the schedule information, JP-A-2002-44627 shows not only powering on and off the projector, switching a source from which a content is acquired to another, and other actions but adjusting image display (changing lightness of projected content).

Assuming that a plurality of image display apparatuses cooperate with one another to display a single image, and that the adjustment of image display is performed only on part of the image display apparatuses, a difference in the display state between the part of the image display apparatuses and the other image display apparatuses occurs, possibly resulting in degradation of the quality of the entire displayed image. Therefore, to set a schedule of the adjustment of the display states, the schedule needs to be set in all the image display apparatuses roughly at the same timing, resulting in a problem of complication of the setting task. Even in a case where no schedule is set but the adjustment of the display states is manually performed, it is necessary to perform operation of causing all the image display apparatuses to perform the adjustment, resulting in a complicated task.

SUMMARY

An advantage of some aspects of the invention is to solve at least a part of the problems described above, and the invention can be implemented as the following forms or application examples.

Application Example 1

An image display apparatus according to this application example includes a display section that displays an image based on image information, a communication section that communicates with another image display apparatus, an operation section that accepts operation for performing first adjustment relating to display of the image, an adjustment section that performs the first adjustment based on the operation accepted by the operation section, and a control section that causes the communication section to transmit, based on the operation accepted by the operation section, control information that causes the other image display apparatus to perform the first adjustment to the other image display apparatus.

According to the image display apparatus described above, when the operation for performing the first adjustment is performed on the operation section, the adjustment section performs the first adjustment, and the control section causes the control information for performing the first adjustment to be transmitted to the other image display apparatus. Therefore, operation performed on one image display apparatus allows a plurality of image display apparatuses to perform the first adjustment, whereby the operation for the adjustment can be simplified.

Application Example 2

It is desirable that the image display apparatus according to the application example described above further includes a clocking section that produces time information, a schedule generation section that generates, based on the operation accepted by the operation section, first schedule information representing a schedule that causes the adjustment section to perform the first adjustment, and a schedule control section that causes the adjustment section to perform the first adjustment based on the time information and the first schedule information, and that the control section causes the communication section to transmit the first schedule information as the control information to the other image display apparatus.

According to the image display apparatus described above, when the first schedule information for performing the first adjustment is generated based on the operation performed on the operation section, the control section causes the first schedule information to be transmitted to the other image display apparatus. That is, setting the first adjustment schedule in one image display apparatus allows a plurality of image display apparatuses to perform the first adjustment in accordance with the common schedule.

Application Example 3

In the image display apparatus according to the application example described above, it is desirable that the control information contains an instruction of initialization of second schedule information set in the other image display apparatus and replacement of the second schedule information with the first schedule information.

According to the image display apparatus described above, the second schedule information set in the other image display apparatus is initialized, whereby mismatch that can occur when the image display apparatus has the first schedule information and the second schedule information, which have been separately set, can be avoided.

Application Example 4

In the image display apparatus according to the application example described above, it is desirable that the operation section accepts setting operation of setting whether or not the control information is transmitted to the other image display apparatus, and that when the operation section has received setting operation of transmitting the control information, the control section causes the control information to be transmitted to the other image display apparatus.

According to the image display apparatus described above, whether or not the control information is transmitted can be selected in accordance with the setting operation accepted by the operation section. An appropriate setting can therefore be made in accordance with the situation in which the image display apparatuses are used, for example, the control information is transmitted in a case where the plurality of image display apparatuses are used in cooperation with one another, whereas no control information is transmitted in a case where the image display apparatuses are separately used.

Application Example 5

In the image display apparatus according to the application example described above, it is desirable that the display section includes a light source and a light modulator that modulates light emitted from the light source to form the image, and that the first adjustment contains adjustment of at least one of brightness and color of the light emitted from the light source.

According to the image display apparatus described above, operation performed on one image display apparatus allows a plurality of image display apparatuses to adjust the light source, whereby the operation for the adjustment of the light source can be simplified.

Application Example 6

In the image display apparatus according to the application example described above, it is desirable that the adjustment section performs, after the first adjustment, adjustment for correcting a difference in at least one of brightness and color between an image displayed by the image display apparatus and an image displayed by the other image display apparatus.

According to the image display apparatus described above, since the adjustment for correcting a difference in the display state (at least one of brightness and color) among a plurality of image display apparatuses is performed after the light source is adjusted, the uniformity of images that are displayed by the plurality of image display apparatuses and form a single image can be maintained.

Application Example 7

An image display system according to this application example is an image display system including a first image display apparatus and a second image display apparatus, and the first image display apparatus includes a display section that displays an image based on image information, a communication section that communicates with the second image display apparatus, an operation section that accepts operation for performing first adjustment relating to display of the image, an adjustment section that performs the first adjustment based on the operation accepted by the operation section, and a control section that causes the communication section to transmit, based on the operation accepted by the operation section, control information that causes the second image display apparatus to perform the first adjustment to the second image display apparatus.

According to the image display system described above, when the operation for performing the first adjustment is performed on the operation section of the first image display apparatus, the adjustment section performs the first adjustment, and the control section causes the control information for performing the first adjustment to be transmitted to the second image display apparatus. Therefore, operation performed on one image display apparatus allows a plurality of image display apparatuses to perform the first adjustment, whereby the operation for the adjustment can be simplified.

Application Example 8

A method for controlling an image display apparatus according to this application example is a method for controlling an image display apparatus that displays an image based on image information, the method including accepting operation for performing first adjustment relating to display of the image, performing the first adjustment based on the accepted operation, and transmitting, based on the accepted operation, control information that causes another image display apparatus to perform the first adjustment to the other image display apparatus.

According to the method for controlling an image display apparatus described above, when the operation for performing the first adjustment is performed, the first adjustment is performed, and the control information for performing the first adjustment is transmitted to the other image display apparatus. Therefore, operation performed on one image display apparatus allows a plurality of image display apparatuses to perform the first adjustment, whereby the operation for the adjustment can be simplified.

BRIEF DESCRIPTION OF THE DRAWINGS

The invention will be described with reference to the accompanying drawings, wherein like numbers reference like elements.

DESCRIPTION OF EXEMPLARY EMBODIMENTS

An image projection system according to an embodiment of the invention will be described below with reference to the drawings.

Figure 1:
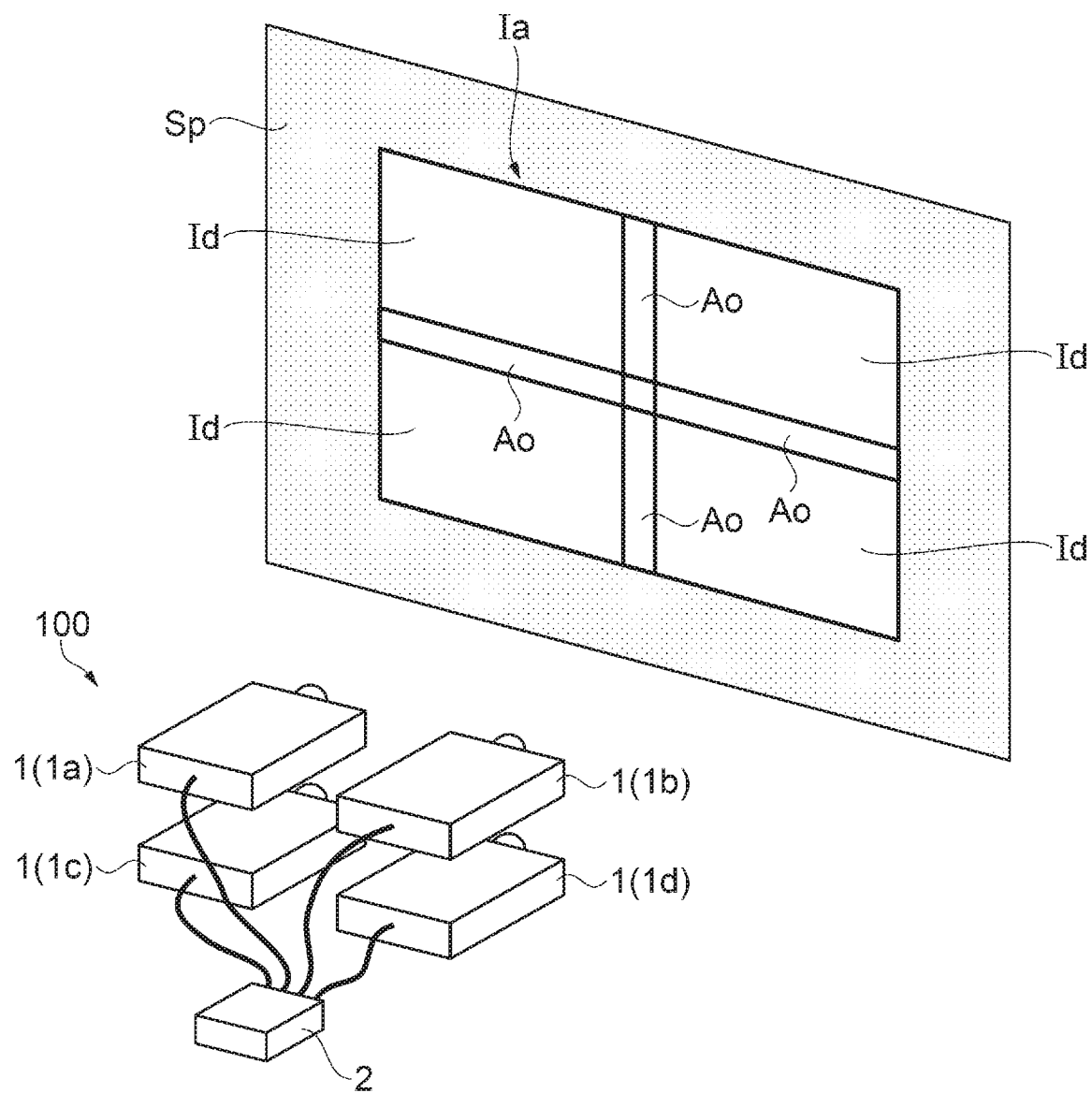
FIG. 1 is a descriptive diagram showing an image projection system.

FIG. 1 is a descriptive diagram showing an image projection system 100 according to the present embodiment.

The image projection system 100, which serves as an image display system includes four projectors 1 (projectors 1a, 1b, 1c, and 1d), which each serve as an image display apparatus, as shown in FIG. 1. The projectors 1 are connected to each other via a hub 2 and each project (display) an image on a projection surface Sp such as a screen and a wall surface. The four projectors 1 are so installed that images projected from the projectors 1 (hereinafter also each referred to as "sub-image Id") are arranged next to each other and the four projectors 1 can therefore cooperate with one another to display a single large image (hereinafter also referred to as "projection image Ia"). The projectors 1 are also so installed that part of the sub-image Id projected by a projector 1 overlaps with part of the sub-image Id projected by another projector 1. The sub-images Id can therefore be seamlessly linked to each other with no gap therebetween. Causing the plurality of projectors 1 to cooperate with one another to display the single projection image Ia is also hereinafter referred to as "multi-projection," and an area Ao, where the sub-images Id overlap with each other, is also referred to as an "overlapping area Ao."

Although not shown in FIG. 1, to allow the projectors 1 to display a desired content image as the projection image Ia, an external image supplying apparatus 3 (see FIG. 2) is connected to the projectors 1, and the image supplying apparatus 3 supplies image information corresponding to the content image.

Figure 2:
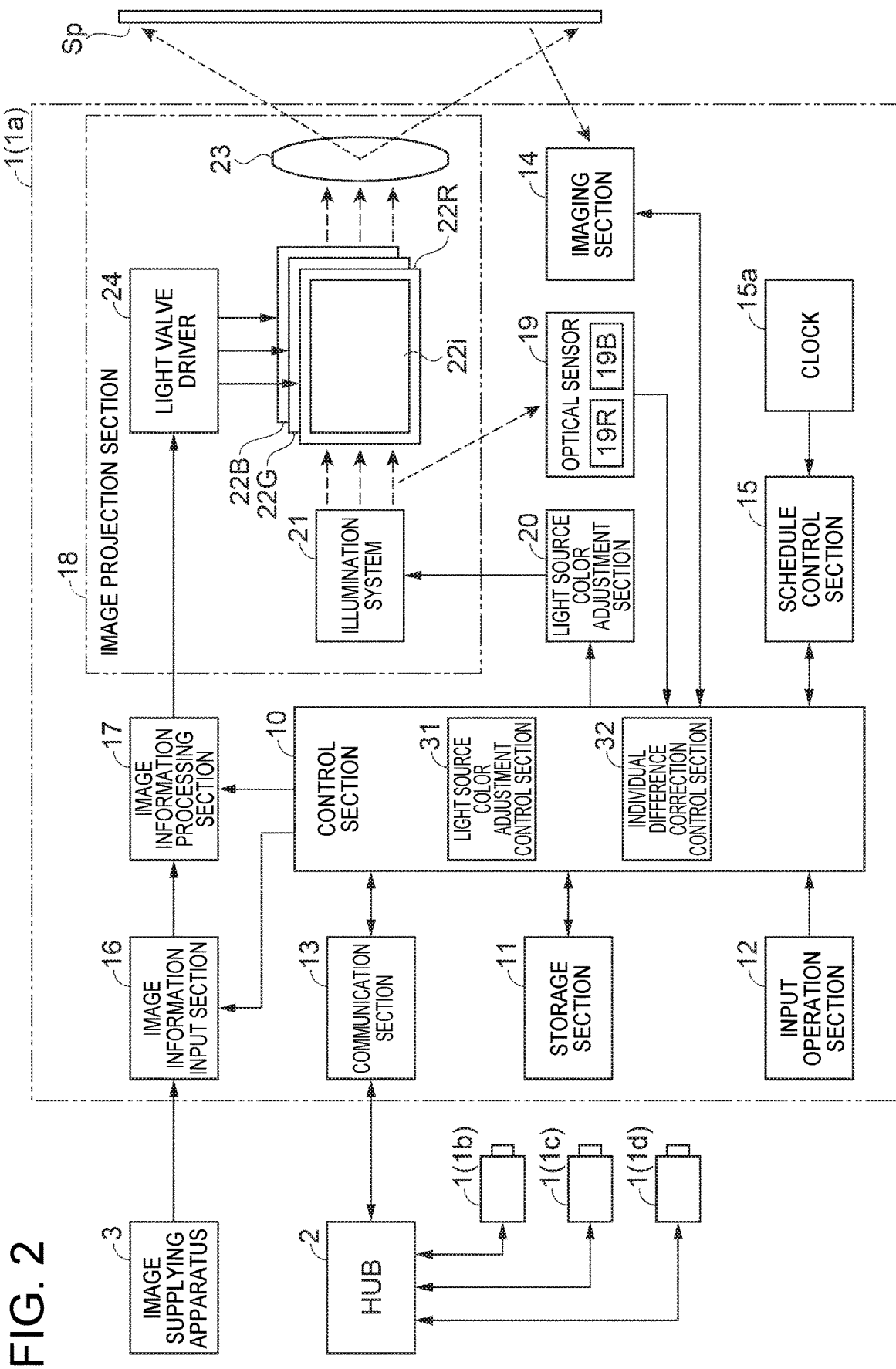
FIG. 2 is a block diagram showing a schematic configuration of a projector.

FIG. 2 is a block diagram showing a schematic configuration of each of the projectors 1. In FIG. 2, the description will be made of one of the four projectors 1 or the projector 1a by way of example, and the other projectors 1b, 1c, and 1d have the same configuration.

The projectors 1 each include a control section 10, a storage section 11, an input operation section 12 as an operation section, a communication section 13, an imaging section 14, a schedule control section 15, an image information input section 16, an image information processing section 17, an image projection section 18 as a display section, an optical sensor 19, and a light source color adjustment section 20, with the sections described above integrated with one another, as shown in FIG. 2. The projectors 1 each project an image on the projection surface Sp via the image projection section 18 based on image information inputted to the image information input section 16.

The control section 10 is formed of one or more processors and operates in accordance with a control program stored in the storage section 11 to oversee and control the action of the projector 1.

The storage section 11 is formed of a RAM (random access memory), a ROM (read only memory), and other memories. The RAM is used to temporarily store a variety of data and other pieces of information, and the ROM stores the control program, control data, and other pieces of information for controlling the action of the projector 1. Although not shown, the storage section 11 in the present embodiment stores information on the plurality of projectors 1, which cooperate with one another to achieve the multi-projection. Specifically, the storage section 11 stores connection information for connecting the projectors 1 to each other (IP address, for example), layout information representing the positions on the projection image Ia where the projectors 1 project the sub-images Id, and other pieces of information. These pieces of information are each information set by a user or automatically detected information.

The input operation section 12 includes a plurality of operation keys that allow the user to issue a variety of instructions to the projector 1. The operation keys provided on the input operation section 12 include a "power key" that switches the state in which the projector 1 is powered on to the state in which the projector 1 is powered off (standby) and vice versa, a "menu key" that causes a setting menu for a variety of settings to be displayed, "direction keys" for selecting an item in the setting menu, a "finalizing key" that finalizes the selected item, and other keys. When the user operates any of the variety of operation keys on the input operation section 12, the input operation section 12 outputs an operation signal according to the content of the user's operation to the control section 10. A remote control (not shown) that allows the user to remotely operate the projector 1 may be used as the input operation section 12. In this case, the remote control issues an infrared operation signal according to the content of the user's operation, and a remote control signal receiver that is not shown receives the infrared operation signal and transmits the signal to the control section 10.

The communication section 13 includes a communication device that communicates with an external apparatus via a network, such as a LAN (local area network). The communication section 13 in the present embodiment is connected to the other projectors 1, which are each the external apparatus, via the hub 3 and transmits and receives information to and from the other projectors 1 under the control of the control section 10. The connection between the communication section 13 and the external apparatus is not limited to wired connection and may be wireless connection.

The imaging section 14 is a camera including a CCD (charge coupled device) sensor, a CMOS (complementary metal oxide semiconductor) sensor, or any other imaging device (not shown). The imaging section 14 captures an image of the projection surface Sp under the control of the control section 10 and outputs image information that is the result of the imaging (captured image information) to the control section 10. The imaging section 14 captures an image at least over the range where the image projection section 18 projects an image (sub-image Id). Therefore, in the case where the projectors 1 are so installed that the plurality of sub-images Id partially overlap with each other, as shown in FIG. 1, the imaging section 14 can also capture an image of part of the adjacent sub-image Id, specifically, at least an area contained in the overlapping area Ao.

The schedule control section 15 includes a processor, a memory, and other components and produces a variety of action requests directed to the control section 10 in accordance with schedule information stored in advance in the memory or any other component. A clock 15a, which serves as a clocking section that produces time information, is connected to the schedule control section 15, and the schedule control section 15 always monitors the time information inputted from the clock 15a. In a case where a schedule is set in relation to the inputted time information, the schedule control section 15 produces an action request in accordance with the set schedule and transmits the action request to the control section 10. The control section 10 controls the action of the projector 1 based on the received action request.

The image information input section 16 is connected to the external image supplying apparatus 3, such as an image reproducing apparatus, and the image supplying apparatus 3 supplies the image information input section 16 with image information corresponding to a content image. The image information input section 16 can further receive from the control section 10 image information stored in the storage section 11 and image information generated by the control section 10. The image information input section 16 outputs the inputted image information to the image information processing section 17.

The image information processing section 17 performs a variety of types of processing on the image information inputted from the image information input section 16 and outputs the processed image information to a light valve driver 24 in the image projection section 18 under the control of the control section 10. For example, the image information processing section 17 processes the image information as required by executing the process of correcting the brightness and color tone of an image, the process of correcting distortion of the shape of an image, the process of superimposing an on-screen display (OSD) image, such as a menu image and a message image, on a content image, and other processes.

The image information input section 16 and the image information processing section 17 may each be formed of one or more processors and other components or may be formed of a dedicated processing device, such as an application specific integrated circuit (ASIC) and a field programmable gate array (FPGA).

The image projection section 18 includes an illumination system 21, three liquid crystal light valves 22R, 22G, and 22B, which each serve as a light modulator, a projection system 23, the light valve driver 24, and other components. In the image projection section 18, the liquid crystal light valves 22R, 22G, and 22B modulate light having exited out of the illumination system 21 to form image light, and the projection system 23 including at least one of a lens and a mirror projects the image light to display an image on the projection surface Sp.

The illumination system 21 in the present embodiment includes an array of laser diodes (LDs), which are each a solid-state light source. Although not described or illustrated in detail, the LD array provided in the illumination system 21 outputs light that belongs, for example, to a wavelength band corresponding to blue (hereinafter also referred to as "blue light"). The LD array outputs, for example, S-polarized blue light, part of which is converted into P-polarized light when passing through a retardation film. The blue light is then separated by a polarization separation element into the S-polarized light and the P-polarized light, and the S-polarized light is incident on a phosphor. The phosphor is excited by the blue light and outputs light that belongs to a wavelength band corresponding to yellow (hereinafter also referred to as "yellow light"). The blue light fluxes separated by the polarization separation element are eventually combined with the yellow light outputted from the phosphor into white light containing components that belong to the plurality of wavelength bands, and the white light exits out of the illumination system 21. The illumination system 21 does not necessarily have the configuration including the LD array as the light source and may instead be formed of a discharge-type light source lamp, such as an ultrahigh-pressure mercury lamp and a metal halide lamp, or any other solid-state light source (such as light emitting diode).

The light having exited out of the illumination system 21 is converted by an optical integration system that is not shown into light having a roughly uniform luminance distribution, which is separated by a color separation system that is not shown into color light components of red (R), green (G), and blue (B), which are the three primary colors of light, and the RGB color light components are then incident on the liquid crystal light valves 22R, 22G, and 22B, respectively.

The liquid crystal light valves 22R, 22G, and 22B are each formed, for example, of a transmissive liquid crystal panel in which a pair of transparent substrates encapsulate a liquid crystal material. The liquid crystal panels each have a rectangular pixel area 22i, which is formed of a plurality of pixels arranged in a matrix, and drive voltage is applicable to the liquid crystal material on a pixel basis.

The light valve driver 24 forms an image in the pixel area 22i of each of the liquid crystal light valves 22R, 22G, and 22B. Specifically, the light valve driver 24 applies drive voltage according to the image information inputted from the image information processing section 17 to each of the pixels in the pixel areas 22i to cause the pixel to have optical transmittance according to the image information. The light having exited out of the illumination system 21 passes through the pixel area 22i of each of the liquid crystal light valves 22R, 22G, and 22B, which modulate the light on a pixel basis, so that image light according to the image information is formed on a color light basis. The thus formed color image light fluxes are combined with one another on a pixel basis by a light combining system that is not shown into image light representing a color image, which is enlarged and projected by the projection system 23 on the projection surface Sp. As a result, an image based on the image information inputted from the image information input section 16 is displayed on the projection surface Sp.

The optical sensor 19 includes a red optical sensor 19R, which detects the illuminance of the red light separated by the color separation system and a blue optical sensor 19B, which detects the illuminance of the blue light separated by the color separation system out of the light having exited out of the illumination system 21. The optical sensor 19 outputs the detected illuminance of the red light and the detected illuminance of the blue light to the control section 10.

The light source color adjustment section 20 adjusts the color balance of the white light having exited out of the illumination system 21 under the control of the control section 10. For example, in the case where the illumination system 21 includes the LD array described above, the light source color adjustment section 20 adjusts the angle of rotation of the retardation film, which converts part of the S-polarized light into the P-polarized light, to adjust the ratio between the blue light and the yellow light, that is, the color balance. The ratio of the light to be converted into the P-polarized light to the blue light outputted from the LD array, that is, the ratio between the S-polarized light and the P-polarized light changes in accordance with the angle of the retardation film on which the light is incident. The color balance is therefore adjusted by driving the retardation film, for example, with a motor to adjust the angle of the retardation film on which the light is incident. In this example, the motor that drives and rotates the retardation film corresponds to the light source color adjustment section 20.

The control section 10 includes a light source color adjustment control section 31 and an individual difference correction control section 32 as functional blocks achieved by the control program.

The light source color adjustment control section 31 acquires from the optical sensor 19 the result of the detection performed by the optical sensor 19, that is, the illuminance of the red light detected with the red optical sensor 19R and the illuminance of the blue light detected with the blue optical sensor 19B and causes the light source color adjustment section 20 to adjust the light source color based on the illuminance values. Specifically, when execution of a light source color adjustment process is instructed by the user's operation of the input operation section 12 or under the control of the schedule control section 15, the light source color adjustment control section 31 changes the color balance of the light source light having exited out of the illumination system 21 back to an initial color balance (at the time of shipment from the factory, for example). Since the color balance of the light source light changes with time, executing the light source color adjustment process on a regular or irregular basis prevents a decrease in the image quality due to a change in the color balance.

In the example described above, the color balance of the light source light (white light) having exited out of the illumination system 21 is determined by the ratio between the blue light and the yellow light, and the blue light is detected with the blue optical sensor 19B. Further, since the red light separated from the yellow light is detected with the red optical sensor 19R, the light source color adjustment control section 31 can sense a change in the color balance of the light source light based on the ratio between the result of the detection performed by the red optical sensor 19R and the result of the detection performed by the blue optical sensor 19B. The ratio between the illuminance of the red light and the illuminance of the blue light in the initial state is stored in the storage section 11, and the light source color adjustment control section 31 causes the light source color adjustment section 20 to adjust the light source color based on the results of the detection performed by the optical sensor 19 in such away that the color balance of the light source color has the initial state again.

The individual difference correction control section 32 controls the process of correcting individual differences in brightness and color tone among the sub-images Id projected by the plurality of projectors 1, which perform the multi-projection. When execution of the individual difference correction process is instructed by the user's operation of the input operation section 12 or under the control of the schedule control section 15, the individual difference correction control section 32 cooperates with the other projectors 1, which perform the multi-projection, to execute the individual difference correction process.

For example, in a case where the projector 1a is instructed to perform the individual difference correction process, the individual difference correction control section 32 of the projector 1a outputs image information corresponding to a predetermined test image (full-screen black image, for example) to the image information input section 16, causes the image projection section 18 to project the test image, and transmits control information that instructs projection of the test image to the other projectors 1b, 1c, and 1d via the communication section 13. When the communication section 13 of each of the projectors 1b, 1c, and 1d receives the control information, the individual difference correction control section 32 of the projector outputs the image information for the test image to the image information input section 16 and causes the image projection section 18 to project the test image.

After the projectors 1 all project the test image, the individual difference correction control section 32 of the projector 1a causes the imaging section 14 to capture the projected test image and transmits control information that instructs capture of the test image to the other projectors 1b, 1c, and 1d via the communication section 13. When the communication section 13 of each of the projectors 1b, 1c, and 1d receives the control information, the individual difference correction control section 32 of the projector causes the imaging section 14 to capture the test image and transmits the result of the imaging (captured image) to the projector 1a via the communication section 13.

The individual difference correction control section 32 of the projector 1a then produces correction information for each of the projectors 1 based on the captured images produced by the projectors 1 in such a way that the test images projected by the projectors 1 have the same brightness and color tone and transmits the correction information to the corresponding projector 1. Thereafter, the image information processing section 17 of each of the projectors 1 corrects the image information based on the produced correction information, whereby the projection image Ia is projected with the individual differences among the projectors 1 suppressed. To appropriately correct the individual differences among the projectors 1, the individual difference correction process is desirably performed in a state in which the color balance of the light source light from each of the projectors 1 has been adjusted, that is, after the projectors 1 have all executed the light source color adjustment process.

It is noted that the imaging sections 14 of the projectors 1 have individual differences. It is therefore difficult to achieve the identical brightness and color tone even when the imaging sections 14 capture the test images projected by the projectors 1 and the resultant captured images are used. However, as described above, the captured images produced by the imaging sections 14 of the projectors 1 contain the sub-images Id projected from the image projection sections 18, and the sub-images Id contain the overlapping areas Ao, in each of which adjacent sub-images Id overlap with each other. That is, images of the overlapping areas Ao are captured by the imaging sections 14 of the plurality of projectors 1. The individual differences among the imaging sections 14 can therefore be corrected by comparison of the results of the imaging performed by the plurality of projectors 1 or captured images of the common overlapping area Ao.

The action of the image projection system 100 will next be described.

The projectors 1 in the present embodiment each have a scheduling function that allows the projector to perform a desired action on a specified date/time.

Figure 3:
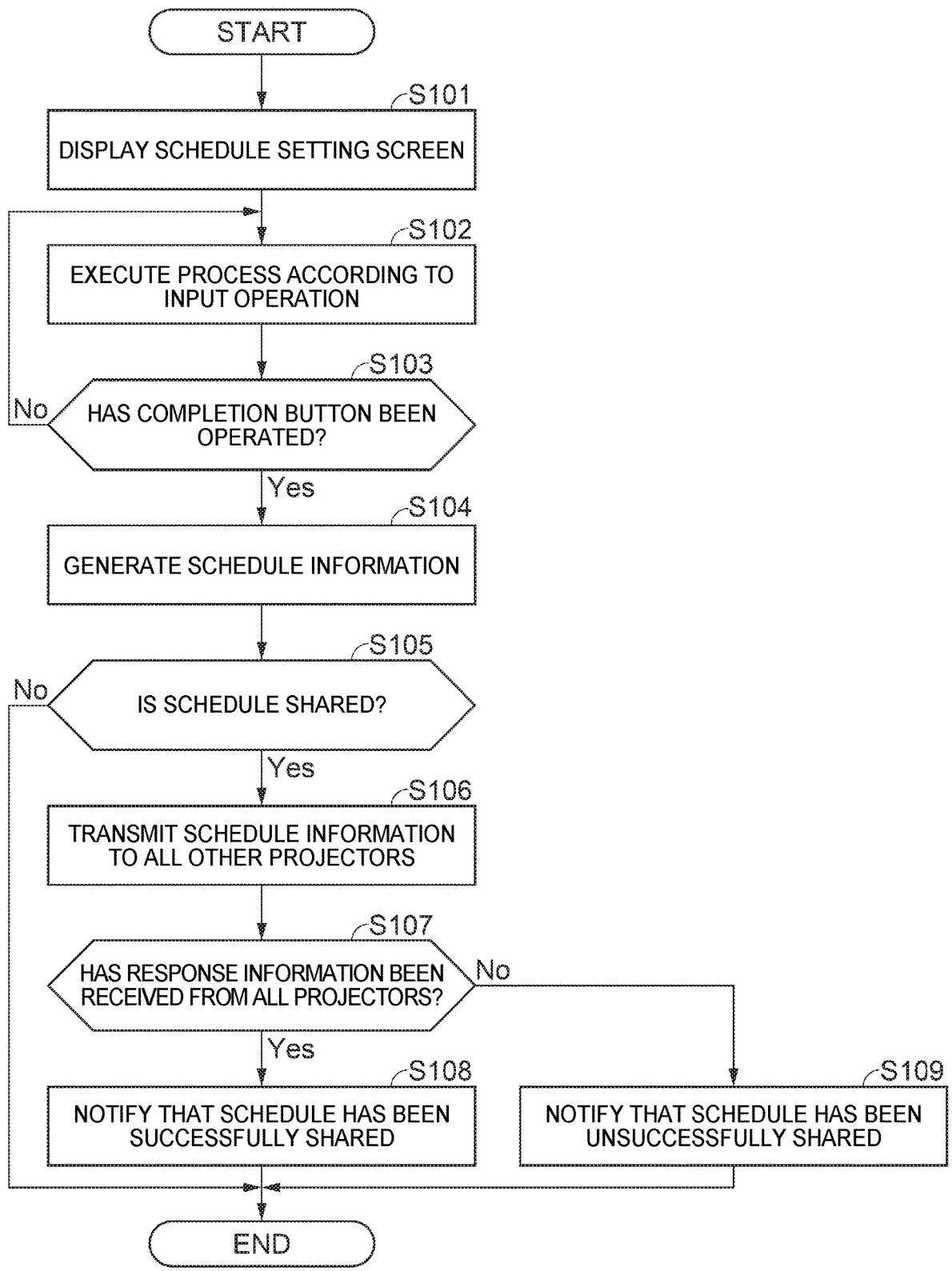
FIG. 3 is a flowchart showing the action of the projector that performs schedule setting.
Figure 4:
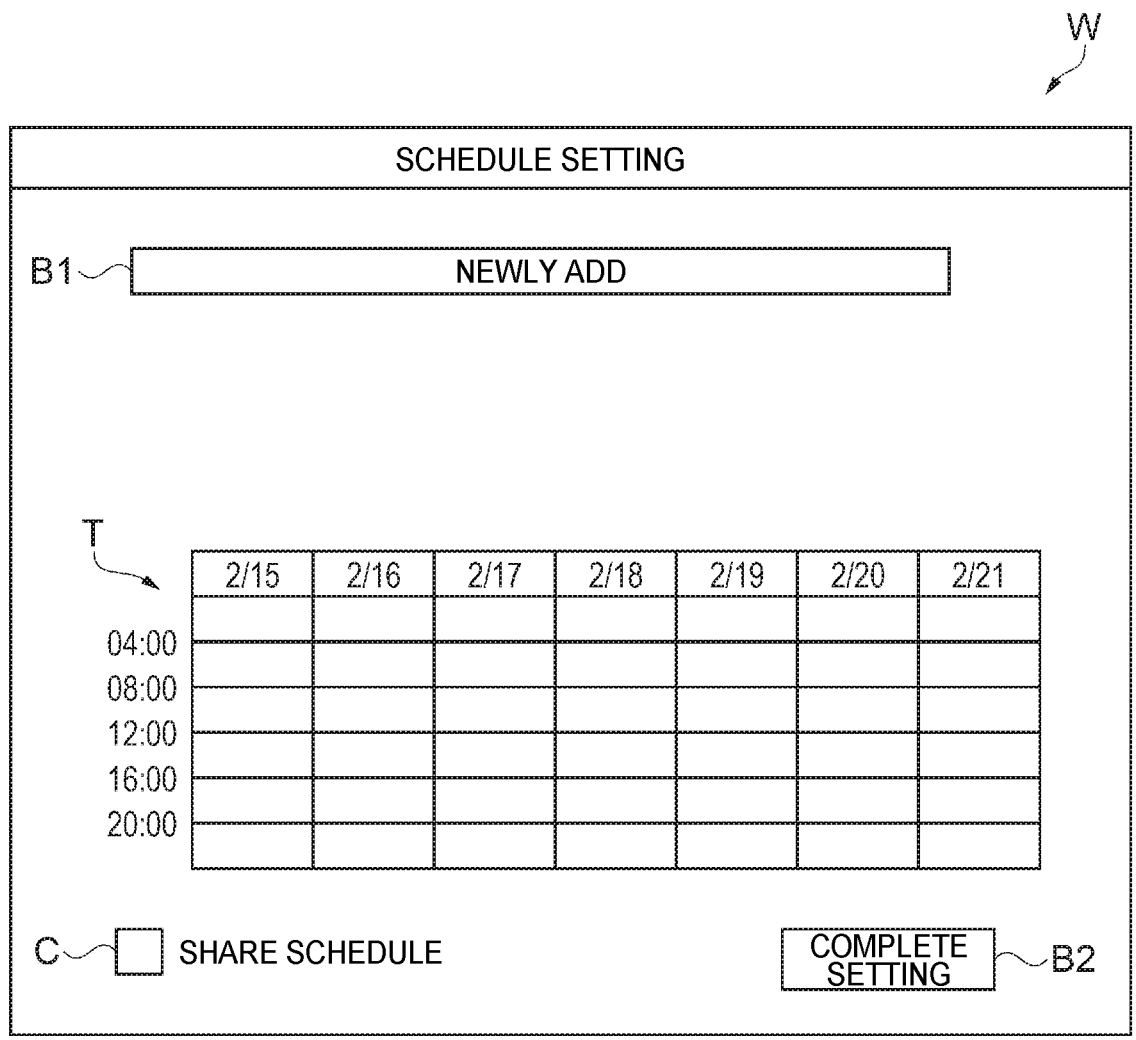
FIG. 4 is a descriptive diagram showing a schedule setting screen.
Figure 5:
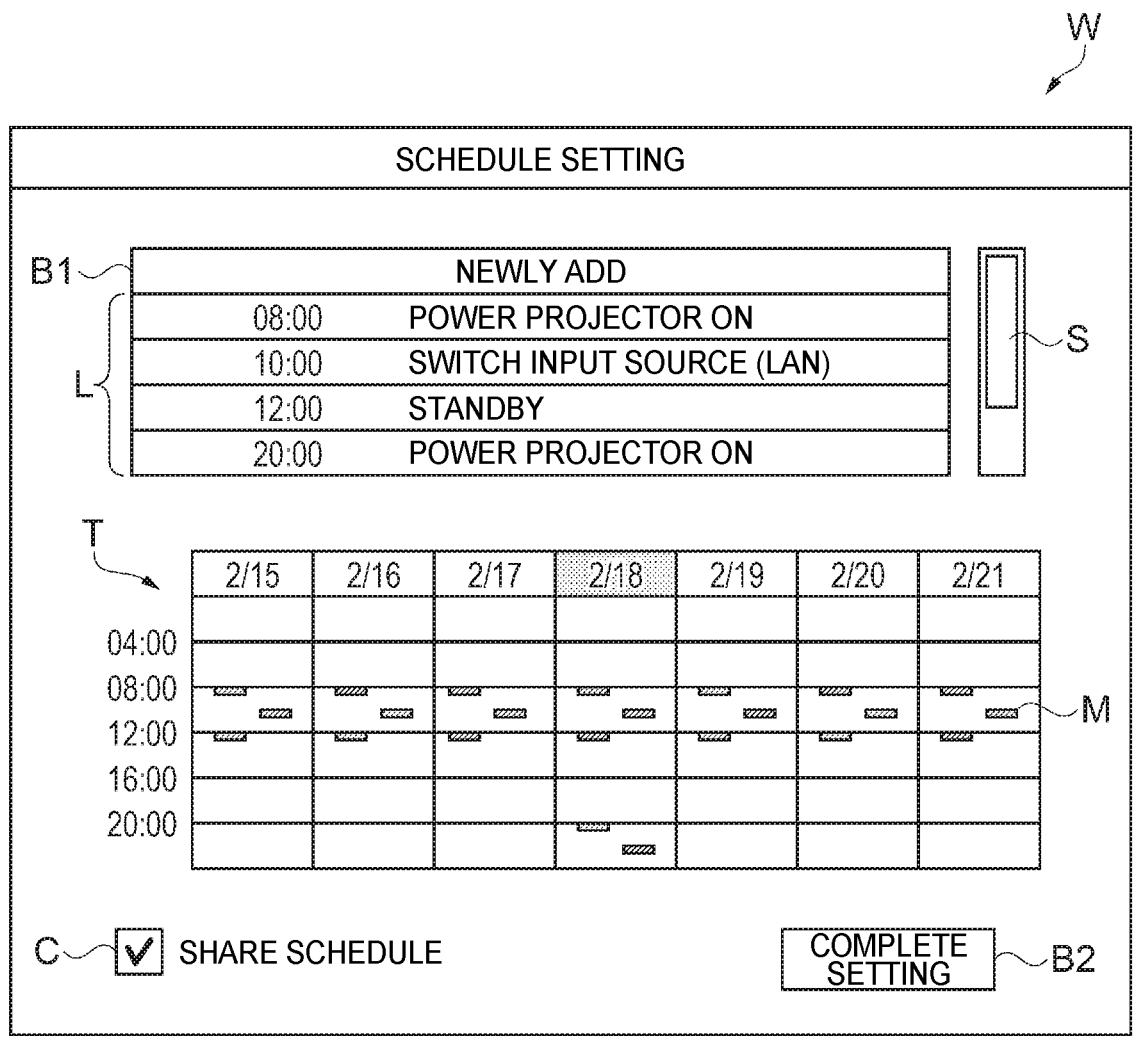
FIG. 5 is a descriptive diagram showing the schedule setting screen.

FIG. 3 is a flowchart showing the action of the projector 1 that performs schedule setting by using the scheduling function. FIGS. 4 and 5 are descriptive diagrams showing a schedule setting screen displayed when the schedule setting is performed.

When the user operates the input operation section 12 for the schedule setting, the control section 10 acts in accordance with the procedure shown in FIG. 3.

In step S101 of FIG. 3, the control section 10 instructs the image information processing section 17 to cause it to display a schedule setting screen W in the form of an OSD image in such a way that the schedule setting screen W overlaps with the projection image Ia. In the following step S102, the control section 10 performs a variety of types of processing in accordance with operation inputted to the schedule setting screen W (operation of direction key and finalizing key, for example) via the input operation section 12.

The schedule setting screen W has an add-in button B1, which reads "Newly add," in an upper portion of the screen and a time table T in a lower portion of the screen, as shown in FIG. 4. The time table T is a table in which dates are allocated in the horizontal direction and points of time are allocated in the vertical direction. In the schedule setting screen W in the present embodiment, the time table T allows the user to visually recognize a one-week schedule. The user can operate the finalizing key with the add-in button B1 selected with any of the direction keys (hereinafter also referred to as operation of add-in button B1) to add (register) a schedule.

When the user operates the add-in button B1, an input screen (not shown) for specifying the content of the schedule is displayed, and the user can specify an action to be performed and the date/time when the action is performed and also specify whether the action is performed once or on a regular basis. The user can repeat the action described above to register a plurality of schedules. Actions that can be specified in the input screen may include not only powering on and off the projector, switching an input source to another, and other actions, but the light source color adjustment process and the individual difference correction process described above. Since it is expected that the color balance of the light source light changes with time as described above, the processes described above are desirably executed on a regular basis (roughly every several days to every several weeks) by using the scheduling function.

The schedule setting screen W in FIG. 5 shows a state in which a plurality of schedules have been registered, and the time table T shows rectangular marks M in date/time positions where the schedules have been registered. When the user selects a desired date in the time table T with any of the direction keys, a list L of schedules to be performed on the selected date is displayed below the add-in button B1. In a case where there are a large number of schedules to be performed and a predetermined number of rows are not enough to contain all the schedules, a scrollbar S is so displayed in a position next to the list L that the user can recognize that the list L displays only part of the schedules. The user can operate any of the direction keys to display the schedules that are not being currently displayed.

In a lower portion of the schedule setting screen W are a check box C, which reads "share schedule," and a completion button B2, which reads "Setting complete." The check box C is a check box to be checked when the user desires to share a schedule set in a projector 1 with another projector 1, and the user can operate the finalizing key with the check box C selected with any of the direction keys to check or uncheck the check box C. The user can operate the completion button B2 to complete the schedule setting.

Referring back to FIG. 3, in step S103, the control section 10 evaluates whether or not the user has operated the completion button B2. In a case where the user has operated the completion button B2, the control section 10 proceeds to the process in step S104, whereas in the case where the user has not operated the completion button B2, the control section 10 returns to the process in step S102. When the completion button B2 is operated, a dialog box for confirmation purposes (not shown) may be displayed as an OSD image. For example, the dialog box shows a confirmation message "Register schedule?" and has three buttons "Yes," "No," and "Cancel." When the "Yes" button is operated, the control section 10 proceeds to the process in step S104, whereas when the "Cancel" button is operated, the control section 10 returns to the process in step S102. When the "No" button is operated, the control section 10 discards the content having been inputted and terminates the entire process.

When the control section 10 proceeds to the process in step S104, the control section 10 generates schedule information based on the content set in the schedule setting screen W and stores the schedule information in the schedule control section 15. That is, the schedule information is information representing the schedule set in the schedule setting screen W. Thereafter, the schedule control section produces an action request specified on a specified date/time in such a way that the control section 10 can act in accordance with the stored schedule information, and the schedule control section 15 outputs the action request to the control section 10.

In step S105, the control section 10 evaluates whether or not the user has set schedule sharing, that is, the user has checked the check box C in the schedule setting screen W. In a case where the check box C has been checked for schedule sharing, the control section 10 proceeds to the process in step S106, whereas in a case where the check box C has not been checked for no schedule sharing, the control section 10 terminates the entire process.

When the control section 10 proceeds to the process in step S106, the control section 10 causes control information containing the generated schedule information to be transmitted via the communication section 13 to all the other projectors 1. The control information contains not only the schedule information but instruction information that instructs initialization of existing schedule information and replacement of the existing schedule information with the schedule information to be transmitted.

Figure 6:
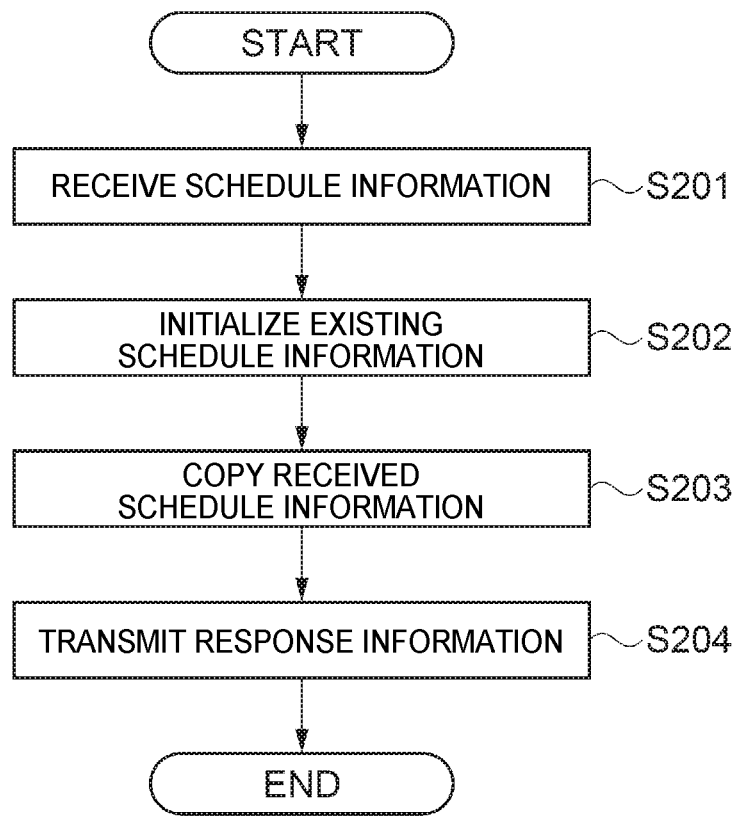
FIG. 6 is a flowchart for describing the action of another projector to which schedule information is transmitted.

FIG. 6 is a flowchart for describing the actions of the other projectors 1 to which the schedule information is transmitted. The description will be made with reference to a case where the projector 1a transmits schedule information to the other projectors 1b, 1c, and 1d.

The other projectors 1 (projectors 1b, 1c, and 1d) each receive the transmitted control information via the communication section 13 (step S201), as shown in FIG. 6. The control section 10 of the projector initializes existing schedule information stored in the schedule control section 15 based on the received control information to achieve a state in which no schedule is set (step S202) and then copies the content of the received schedule information in place of the initialized schedule information (step S203). In other words, the control section 10 replaces the schedule information stored in the schedule control section 15 with the received schedule information. The control section 10 then causes response information representing that the schedule information has been successfully copied (has replaced existing schedule information) to be transmitted to the projector 1a (step S204) and terminates the entire process.

Referring back to FIG. 3, in step S107, the control section 10 evaluates whether or not all the other projectors 1 have transmitted the response information, that is, the transmitted schedule information has been successfully reflected in all the other projectors 1. In a case where the control section 10 has received from all the other projectors 1 the response information representing that the schedule information has been successfully replaced, the control section 10 proceeds to the process in step S108. On the other hand, in a case where the control section 10 has not successfully received the response information from at least one projector 1, for example, in a case where abnormality has occurred in the communication with any of the other projectors 1, the control section 10 proceeds the process in step S109.

In the case where the schedule information has been correctly reflected and the control section 10 proceeds to the process in step S108, the control section 10 instructs the image information processing section 17 to cause it to display a message image notifying that the schedule has been successfully shared in the form of an OSD image in such a way that the message image overlaps with the projection image Ia, and the control section 10 terminates the entire process.

On the other hand, in the case where the schedule information has not been correctly reflected and the control section 10 proceeds to the process in step S109, the control section 10 instructs the image information processing section 17 to cause it to display a message image notifying that the schedule has been unsuccessfully shared in the form of an OSD image in such a way that the message image overlaps with the projection image Ia, and the control section 10 terminates the entire process.

Since the projectors 1 according to the present embodiment act as described above, when the user sets a schedule that causes the light source color adjustment process to be executed in one of the projectors 1 (first image display apparatus), the schedule is shared by the other projectors 1

(second image display apparatus). That is, when the user performs operation of causing one projector 1 to execute the light source color adjustment process, all the projectors 1 that perform the multi-projection execute the light source color adjustment process at the same timing. The user can therefore suppress, through simple operation, differences in the color balance of the light source light among the plurality of projectors 1 to improve the image quality in the multi-projection.

Powering a projector on and off, the light source color adjustment process, and other processes are individually executable actions of each of the projectors 1, whereas the individual difference correction process is a process executed by the plurality of projectors 1 in cooperation with one another. As described above, when one of the projectors 1 starts the individual difference correction process, the projector 1 controls the actions of the other projectors 1 to project a predetermined test image and cause the imaging sections 14 to capture the projected test images to correct individual differences among the projectors 1. That is, to execute the individual difference correction process by using the scheduling function, one of the projectors 1 only needs to start the individual difference correction process, and the other projectors 1 do not need to start the individual difference correction process. Therefore, in a case where schedule information to be transmitted to the other projectors 1 contains the individual difference correction process, the control section 10, when transmitting schedule information in step S106, removes the individual difference correction process from the items in the schedule information and then transmits the schedule information. It is noted in this case that the schedule-information-transmitting projector 1 may not remove the individual difference correction process, but that the other projectors 1 having received the schedule information may ignore the individual difference correction process contained in the schedule information.

As described above, according to the image projection system 100, the projectors 1, and the method for controlling the image projection system 100 and the projectors 1 according to the present embodiment, the following effects can be provided.

(1) According to the present embodiment, when schedule information is so generated that a schedule for executing the light source color adjustment process is set in the schedule setting screen W, the control section 10 transmits the schedule information to the other projectors 1 via the communication section 13. That is, setting a schedule for the light source color adjustment process in one of the projectors 1 allows the plurality of projectors 1 to execute the light source color adjustment process in accordance with the common schedule.

(2) According to the present embodiment, when the schedule information is transmitted to the other projectors 1, existing schedule information stored in the other projectors 1 is initialized, whereby mismatch that can occur when a projector has separately set pieces of schedule information can be avoided.

(3) According to the present embodiment, whether or not control information (schedule information) is transmitted to the other projectors 1 can be selected in accordance with whether or not the check box C in the schedule setting screen W has been checked. An appropriate setting can therefore be made in accordance with the situation in which the projectors 1 are used, for example, the control information is transmitted in the case where the plurality of projectors 1 are used in cooperation with one another, whereas no control information is transmitted in a case where the projectors 1 are separately used.

In the embodiment described above, the light source color adjustment process corresponds to first adjustment, and the light source color adjustment section 20 and the light source color adjustment control section 31 correspond to an adjustment section. The individual difference correction control section 32, which produces correction information for corroding individual differences based on captured images produced by the imaging sections 14, and the image information processing section 17, which corrects image information based on the produced correction information, also correspond to the adjustment section. The control section 10 that generates schedule information in accordance with a schedule set in the schedule setting screen W corresponds to a schedule generation section. Schedule information to be transmitted to the other projectors 1 corresponds to first schedule information, and existing schedule information stored in the other projectors 1 corresponds to second schedule information. The operation of checking the check box C in the schedule setting screen W corresponds to setting operation of setting whether or not control information (schedule information) is transmitted to the other image display apparatus.

Variations

The embodiment described above may be changed as follows.

In the embodiment described above, the case where the light source color adjustment process and other processes are automatically executed by using the scheduling function has been presented by way of example, but not necessarily, and these processes can be manually executed in response to operation performed on the input operation section 12. For example, when the user operates the input operation section 12 to instruct the projector 1a to execute the light source color adjustment process, the control section 10 of the projector 1a executes the light source color adjustment process under the control of the light source color adjustment control section 31 and causes control information for execution of the light source color adjustment process to be transmitted to the other projectors 1b, 1c, and 1d via the communication section 13. The control section 10 of each of the projectors 1b, 1c, and 1d, when the communication section 13 receives the control information, executes the light source color adjustment process under the control of the light source color adjustment control section 31. Also in this aspect, the image quality in the multi-projection can be improved in response to simple operation. Whether or not instruction of execution of a process issued to one projector 1 is followed by execution of the same process by the other projectors 1 may depend on the result of inquiry made to the user whenever the instruction is issued or may be set in advance.

In the embodiment described above, after all the projectors 1 execute the light source color adjustment process, the individual different correction process may be executed irrespective of whether or not the user has issued the instruction and the condition in which the schedule has been set. According to the aspect described above, since the light source color adjustment process is followed by the individual different correction process, the uniformity of images that are displayed by the plurality of projectors 1 and form a single image can be maintained.

In the embodiment described above, the light source color adjustment process may be the process of adjusting at least one of the brightness and color of the light source light. The individual different correction process may be the process of correcting a difference in at least one of the brightness and color of images displayed by the projectors 1.

In the embodiment described above, the description has been made of the case where operation performed on one of the projectors 1 causes all the projectors 1 to execute the light source color adjustment process, but the adjustment process that all the projectors 1 should execute is not limited to the light source color adjustment process and may, for example, be a geometric correction process of correcting the shape of an image to a rectangular shape. Specifically, to correct the shape of the overall projection image Ia displayed in the multi-projection to a rectangular shape, the sub-image Id projected by each of the projectors 1 is desired in some cases to be first corrected to a rectangular shape. In this case, the configuration in which operation performed on one of the projectors 1 causes all the projectors 1 to execute the geometric correction process allows the geometric correction of each of the sub-images Id to be achieved in response to simple operation.

In the embodiment described above, the case where the sub-images Id projected from the four projectors 1 are arranged in a 2×2 matrix, but the number of projectors 1 and the arrangement thereof are not limited to those described above. For example, the plurality of sub-images Id may be arranged in a single vertical or horizontal row.

In the embodiment described above, the projectors 1 each include the imaging section 14, and the imaging section 14 captures the test image, but not necessarily. For example, an imaging apparatus independent of the projectors 1 may capture the entire projection image Ia.

In the embodiment described above, the transmissive liquid crystal light valves 22R, 22G, and 22B are used as the light modulator. Instead, reflective light modulators, such as reflective liquid crystal light valves, may be used. Still instead, the light modulator may, for example, be formed of digital mirror devices that each control, for each micromirror that serves as a pixel, the exiting direction of the light incident thereon to modulate the light having exited out of the illumination system 21. The configuration in which a plurality of light modulators are provided on a color light basis is not necessarily employed, and a configuration in which a single light modulator modulates a plurality of color light fluxes in a time division manner may instead be employed.

In the embodiment described above, the projectors 1 have been described as an example of the image display apparatus, but the image display apparatus is not limited to the projectors 1 and may instead be liquid crystal displays, organic EL (electro luminescence) displays or any other image display apparatuses.

What is claimed is:

1. An image display apparatus comprising:
a display section that displays an image based on image information;
a communication section that communicates with another image display apparatus;
an operation section that accepts operation for performing first adjustment relating to display of the image;
an adjustment section that performs the first adjustment based on the operation accepted by the operation section; and
a control section that causes the communication section to transmit, based on the operation accepted by the operation section, control information that causes the other image display apparatus to perform the first adjustment to the other image display apparatus.

2. The image display apparatus according to claim 1, further comprising:
a clocking section that produces time information;
a schedule generation section that generates, based on the operation accepted by the operation section, first schedule information representing a schedule that causes the adjustment section to perform the first adjustment; and
a schedule control section that causes the adjustment section to perform the first adjustment based on the time information and the first schedule information,
wherein the control section causes the communication section to transmit the first schedule information as the control information to the other image display apparatus.

3. The image display apparatus according to claim 2,
wherein the control information contains an instruction of initialization of second schedule information set in the other image display apparatus and replacement of the second schedule information with the first schedule information.

4. The image display apparatus according to claim 1,
wherein the operation section accepts setting operation of setting whether or not the control information is transmitted to the other image display apparatus, and
when the operation section has received setting operation of transmitting the control information, the control section causes the control information to be transmitted to the other image display apparatus.

5. The image display apparatus according to claim 1,
wherein the display section includes a light source and a light modulator that modulates light emitted from the light source to form the image, and
the first adjustment contains adjustment of at least one of brightness and color of the light emitted from the light source.

6. The image display apparatus according to claim 5,
wherein the adjustment section performs, after the first adjustment, adjustment for correcting a difference in at least one of brightness and color between an image displayed by the image display apparatus and an image displayed by the other image display apparatus.

7. An image display system comprising a first image display apparatus and a second image display apparatus,
wherein the first image display apparatus includes
a display section that displays an image based on image information,
a communication section that communicates with the second image display apparatus,
an operation section that accepts operation for performing first adjustment relating to display of the image,
an adjustment section that performs the first adjustment based on the operation accepted by the operation section, and
a control section that causes the communication section to transmit, based on the operation accepted by the operation section, control information that causes the second image display apparatus to perform the first adjustment to the second image display apparatus.

8. The image display system according to claim 7, further comprising:
a clocking section that produces time information;
a schedule generation section that generates, based on the operation accepted by the operation section, first schedule information representing a schedule that causes the adjustment section to perform the first adjustment; and a schedule control section that causes the adjustment section to perform the first adjustment based on the time information and the first schedule information, wherein the control section causes the communication section to transmit the first schedule information as the control information to the other image display apparatus.

9. The image display system according to claim 7, wherein the operation section accepts setting operation of setting whether or not the control information is transmitted to the other image display apparatus, and when the operation section has received setting operation of transmitting the control information, the control section causes the control information to be transmitted to the other image display apparatus.

10. A method for controlling an image display apparatus that displays an image based on image information, the method comprising:

accepting operation for performing first adjustment relating to display of the image;

performing the first adjustment based on the accepted operation; and transmitting, based on the accepted operation, control information that causes another image display apparatus to perform the first adjustment to the other image display apparatus.

11. The method for controlling an image display apparatus according to claim 10, further comprising:

producing time information;

generating, based on the operation, first schedule information representing a schedule for performing the first adjustment;

performing the first adjustment based on the time information and the first schedule information; and transmitting the first schedule information as the control information to the other image display apparatus.

12. The method for controlling an image display apparatus according to claim 11, wherein the control information contains an instruction of initialization of second schedule information set in the other image display apparatus and replacement of the second schedule information with the first schedule information.

13. The method for controlling an image display apparatus according to claim 10, further comprising:

accepting setting operation of setting whether or not the control information is transmitted to the other image display apparatus; and transmitting, when the operation section has received setting operation of transmitting the control information, the control information to the other image display apparatus.

14. The method for controlling an image display apparatus according to claim 10, wherein the first adjustment contains adjustment of at least one of brightness and color of light emitted from a light source.

15. The method for controlling an image display apparatus according to claim 14, further comprising performing, after the first adjustment, adjustment for correcting a difference in at least one of brightness and color between an image displayed by the image display apparatus and an image displayed by the other image display apparatus.

* * * * *